US006935955B1

(12) United States Patent
Kaminkow et al.

(10) Patent No.: US 6,935,955 B1
(45) Date of Patent: Aug. 30, 2005

(54) GAMING DEVICE WITH AWARD AND DEDUCTION PROXIMITY-BASED SOUND EFFECT FEATURE

(75) Inventors: Joseph E. Kaminkow, Reno, NV (US); Jeffrey P. Laakso, Reno, NV (US)

(73) Assignee: IGT, Reno, NV (US)

( * ) Notice: Subject to any disclaimer, the term of this patent is extended or adjusted under 35 U.S.C. 154(b) by 566 days.

(21) Appl. No.: 09/656,663

(22) Filed: Sep. 7, 2000

(51) Int. Cl.[7] .................................................. A63F 13/00

(52) U.S. Cl. ............................................ 463/35; 463/20

(58) Field of Search .......................... 273/138.1, 143 R, 273/371, 376, 381; 463/16–20, 35, 49–57; 434/116

(56) References Cited

U.S. PATENT DOCUMENTS

| | | | |
|---|---|---|---|
| 3,831,172 A | | 8/1974 | Olliges et al. |
| 4,300,225 A | | 11/1981 | Lambl |
| 4,314,236 A | | 2/1982 | Mayer et al. |
| 4,339,798 A | | 7/1982 | Hedges et al. |
| 4,344,345 A | | 8/1982 | Sano |
| 4,363,482 A | | 12/1982 | Goldfarb |
| RE31,441 E | | 11/1983 | Nutting et al. |
| 4,496,149 A | * | 1/1985 | Schwartzberg .............. 273/454 |
| 4,582,324 A | | 4/1986 | Koza et al. ............. 273/138 A |
| 4,618,150 A | * | 10/1986 | Kimura .................. 273/143 R |
| 4,624,459 A | | 11/1986 | Kaufman |
| 4,660,107 A | | 4/1987 | Chippendale, Jr. |
| 4,695,053 A | | 9/1987 | Vazquez, Jr. et al. |
| 4,712,189 A | | 12/1987 | Mohri |
| 4,732,386 A | | 3/1988 | Rayfiel |
| 4,733,593 A | | 3/1988 | Rothbart |
| 4,791,558 A | | 12/1988 | Chaitin et al. |

(Continued)

FOREIGN PATENT DOCUMENTS

| | | | | | |
|---|---|---|---|---|---|
| GB | 2 201 279 A | | 8/1988 | | |
| JP | 11197292 A | | 12/1997 | | |
| JP | 11197292 A | * | 7/1999 | ............. | A63F/5/04 |
| JP | 411216221 A | | 8/1999 | | |
| JP | 02000296209 A | | 10/2000 | | |

OTHER PUBLICATIONS

A Salute to Game Shows—The Price is Right—Pricing Games—Three Strikes, p. 8 of 9 [online],[retrieved on Aug. 16, 2000]. Retrieved from the Internet:<http://ben–schumin.simplenet.com/game–shows/shows/price–is–right/pricing–games–4.htm>.*

Chutes and Ladders CD–ROM Game, Hasbro Inc., 1999.*

Article, "Frankie & Annette's Beach Party Bally Gaming," published by Strictly Slots, Dec., 2001.

Article, "Megaman X's Soundcard History Museum," pp. 1–5, retrieved on May 11, 2000 on Internet at http://digitalparadise.cgocable.ca/MegaMan_X/Soundcards.

Article, "Microprocessor Report," pp. 2, 12–17, published by Micro Design Resources on Mar. 25, 1996.

Article, "Monopoly Movers & Shakers Williams/WMS Gaming," published by Strictly Slots publication in Jul., 2000.

(Continued)

*Primary Examiner*—Scott E. Jones
(74) *Attorney, Agent, or Firm*—Bell, Boyd & Lloyd LLC

(57) ABSTRACT

The present invention relates to a gaming device which generates a sound effect when the player comes within a certain proximity of reaching an award or deduction but does not reach an award or deduction. The gaming device also generates sound effects when the player fails to reach an award a certain number of times. This feature, usable in primary games and bonus rounds, provides players with information and enhances the enjoyment and entertainment which players experience.

22 Claims, 8 Drawing Sheets

U.S. PATENT DOCUMENTS 4,876,937 A 10/1989 Suzuki
4,961,575 A * 10/1990 Perry ........................ 273/454
4,974,483 A 12/1990 Luzzatto
4,974,857 A * 12/1990 Beall et al. ................. 273/371
5,096,195 A 3/1992 Gimmon
5,119,465 A 6/1992 Jack
5,179,517 A 1/1993 Sarbin et al.
5,221,801 A 6/1993 Bruti et al.
5,223,828 A * 6/1993 McKiel, Jr. ............ 340/825.19
5,242,163 A 9/1993 Fulton
5,258,574 A 11/1993 Kawano
5,266,736 A 11/1993 Saito
5,275,400 A 1/1994 Weingardt et al.
5,287,102 A * 2/1994 McKiel, Jr. ............ 340/825.19
5,342,047 A 8/1994 Heidel et al.
5,371,345 A 12/1994 LeStrange et al.
5,390,938 A 2/1995 Takeya
5,393,061 A 2/1995 Manship et al.
5,393,070 A 2/1995 Best
5,429,507 A * 7/1995 Kaplan ................... 273/141 R
5,430,835 A 7/1995 Williams et al.
5,446,902 A 8/1995 Islam
5,449,173 A 9/1995 Thomas et al. ......... 273/143 R
5,469,511 A * 11/1995 Lewis et al. .................. 348/62
5,470,233 A * 11/1995 Fruchterman et al. . 340/825.19
5,472,197 A 12/1995 Gwiasda et al.
5,508,699 A * 4/1996 Silverman ................ 340/407.1
5,515,764 A 5/1996 Rosen
5,557,253 A 9/1996 Blickstein
5,625,845 A 4/1997 Allran
5,668,996 A 9/1997 Radinsky
5,695,188 A * 12/1997 Ishibashi ................ 273/143 R
5,697,843 A 12/1997 Manship et al.
5,703,310 A 12/1997 Kurakake et al.
5,707,286 A 1/1998 Carlson
5,715,459 A 2/1998 Celi
5,745,761 A 4/1998 Celi
5,745,762 A 4/1998 Celi
5,758,875 A 6/1998 Giacalone, Jr.
5,762,552 A 6/1998 Vuong et al.
5,766,074 A 6/1998 Cannon et al. ............... 463/16
5,772,509 A 6/1998 Weiss
5,778,231 A 7/1998 Van Hoff
5,792,972 A 8/1998 Houston
5,802,364 A 9/1998 Senator
5,807,172 A 9/1998 Piechowiak
5,809,303 A 9/1998 Senator
5,833,538 A 11/1998 Weiss
5,839,958 A 11/1998 Ozarow
5,848,932 A 12/1998 Adams
5,854,927 A 12/1998 Gelissen
5,880,386 A 3/1999 Wachi et al.
5,889,990 A 3/1999 Coleman
5,892,171 A 4/1999 Ide
5,902,184 A 5/1999 Bennett et al.
5,908,354 A * 6/1999 Okuniewicz ................. 463/35
5,910,048 A 6/1999 Feinberg
5,911,071 A 6/1999 Jordan
5,920,720 A 7/1999 Toutonghi
5,923,878 A 7/1999 Marsland
5,923,880 A 7/1999 Rose
5,930,509 A 7/1999 Yates
5,937,193 A 8/1999 Evoy
5,946,487 A 8/1999 Dangelo
5,946,489 A 8/1999 Yellin
5,964,846 A 10/1999 Eisler
5,966,535 A 10/1999 Benedikt
5,967,894 A 10/1999 Kinoshita et al.
5,970,249 A 10/1999 Holze
5,978,585 A 11/1999 Crelier
5,997,401 A 12/1999 Crawford
5,999,731 A 12/1999 Yellin
6,003,038 A 12/1999 Chen
6,015,346 A 1/2000 Bennett
D421,277 S 2/2000 McGahn et al.
6,021,272 A 2/2000 Cahill
6,021,273 A 2/2000 Criesemer
6,026,238 A 2/2000 Bond
6,029,000 A 2/2000 Woosley
6,031,993 A 2/2000 Andrews
6,035,120 A 3/2000 Ravichandran
6,056,642 A 5/2000 Bennett ....................... 463/20
6,062,979 A 5/2000 Inoue
6,066,181 A 5/2000 DeMaster
6,071,192 A 6/2000 Weiss
6,074,432 A 6/2000 Guccione
6,075,940 A 6/2000 Gosling
6,084,169 A 7/2000 Hasegawa et al.
6,089,976 A 7/2000 Schneider et al. ............ 463/16
6,089,978 A 7/2000 Adams
6,092,147 A 7/2000 Levy
6,096,095 A 8/2000 Halstead
6,102,400 A 8/2000 Scott et al.
6,106,393 A 8/2000 Sunaga et al.
6,110,041 A 8/2000 Walker et al.
6,110,226 A 8/2000 Bothner
6,113,495 A 9/2000 Walker
6,117,009 A 9/2000 Yoseloff
6,126,165 A 10/2000 Sakamoto ............... 273/143 R
6,131,191 A 10/2000 Cierniak
6,138,273 A 10/2000 Sturges
6,141,794 A 10/2000 Dice
6,142,875 A 11/2000 Kodachi et al.
6,146,276 A 11/2000 Okuniewicz
6,155,925 A 12/2000 Giobbi et al.
6,159,097 A 12/2000 Gura
6,174,233 B1 1/2001 Sunaga et al.
6,174,235 B1 1/2001 Walker et al.
6,175,632 B1 1/2001 Marx
6,198,395 B1 * 3/2001 Sussman .................. 340/407.1
6,217,448 B1 4/2001 Olsen
6,238,288 B1 5/2001 Walker et al.
6,241,612 B1 6/2001 Heredia
6,254,481 B1 7/2001 Jaffe
6,270,411 B1 8/2001 Gura et al.
6,293,869 B1 * 9/2001 Kwan et al. ................ 273/371
6,302,790 B1 10/2001 Brossard
6,309,299 B1 * 10/2001 Weiss .......................... 463/20
6,309,301 B1 10/2001 Sano
6,311,982 B1 * 11/2001 Lebensfeld et al. ......... 273/454
6,328,648 B1 12/2001 Walker et al.
6,390,923 B1 5/2002 Yoshitomi et al.
6,409,596 B1 * 6/2002 Hayashida et al. ........... 463/31
6,416,411 B1 * 7/2002 Tsukahara .................... 463/35
6,516,466 B1 2/2003 Jackson
6,537,152 B2 3/2003 Seelig et al.
6,544,122 B2 4/2003 Araki et al.
6,554,703 B1 4/2003 Bussick et al.
6,561,908 B1 5/2003 Hoke
6,599,195 B1 7/2003 Araki et al.
6,638,169 B2 10/2003 Wilder et al.
6,656,046 B1 12/2003 Yoseloff et al. ............... 463/20
2002/0077165 A1 6/2002 Bansemer et al.
2003/0064798 A1 4/2003 Attila et al.
2003/0064808 A1 4/2003 Hecht et al. .................. 463/42
2003/0073489 A1 4/2003 Hecht et al. .................. 463/35
2003/0073490 A1 4/2003 Hecht et al.
2003/0073491 A1 4/2003 Hecht et al. .................. 463/35

OTHER PUBLICATIONS

Brochure of Bally Gaming, Inc., "EVO Hybrid Frankie & Annette's Beach Party," published by Bally Gaming, Inc. in the year 2001 on or before Dec. thereof.

Brochure of Bally Gaming, Inc., "Frankie & Annette's Beach Party (EVO Hybrid)," http://www.ballygaming.com/gameroom/games.asp?gameID=664, Jan. 9, 2004.

Brochure of IGT, "Elephant King," http://www.igt.com/games/new__games/elephant.html, Mar. 21, 2001.

Brochure of IGT, "Leopard Spots, Double Diamond 2000, Little Green Men, Elephant King, I Dream of Jeannie," available in Oct., 1999.

Brochure of IGT, "Run for Your Money S–Plus Limited," published in the year 1998 on or before Dec. thereof.

Brochure of IGT, "Top Dollar S–Plus Limited," published in the year 1998 on or before Dec. thereof.

Brochure of IGT, "Wheel of Fortune," published in the year 1998 on or before Dec. thereof.

Brochure of WMS Gaming Inc., "Meet the Next Generation of Monopoly Slot Machines from WMS Gaming!" published by Hasbro, Inc. in the year 1999 on or before Dec. thereof.

Brochure of WGS Gaming Inc., "Monopoly Chairman of the Board," published by Hasbro, Inc. in the year 1999 on or before Dec. thereof.

Brochure of WMS Gaming Inc., "Monopoly Once Around," published by Hasbro, Inc. in the year 1998 on or before Dec. thereof.

Brochure of WMS Gaming Inc., "Monopoly Reel Estate," published by Hasbro, Inc. in the year 1998 on or before Dec. thereof.

Brochure of WMS Gaming Inc., "Movers & Shakers," published by Hasbro, Inc. in the year 2000 on or before Dec. thereof.

Description of Accelerated Credit Roll–Up in Gaming Machines written by IGT, available in the year 1999 on or before Dec. thereof.

Description of Action Prompts in Gaming Machines, written by IGT, available in the year 1999 on or before Dec. thereof.

Description of Last Sound in Credit Roll–Up in Gaming Machines written by IGT, available in the year 2000 on or before Dec. thereof.

Description of Lighting Features in Gaming Machines, written by IGT, available in the year 1999 on or before Dec. thereof.

Description of Maximum Wager Sound and Bet Sounds in Gaming Devices written by IGT, available in the year 2000 on or before Dec. thereof.

Description of Sound Effects in Gaming Devices written by IGT, available in the year 2000 on or before Dec. thereof.

Description of Sound Feature in Totem Pole™ Gaming Machine written by IGT, available in the year 1997 on or before Dec. thereof.

Description of Tempo Change In Gaming Machines written by IGT, available in the year 2000 on or before Dec. thereof.

Description of Verbal Wager Feature in "Dick Clark" Gaming Machine written by IGT, available in the year 2000 on or before Dec. thereof.

Description of Volume Control Functions in Gaming Machines written by IGT, available in the year 1999 on or before Dec. thereof.

MIDI Media Adaptation Layer for IEEE–1394, published by the Association of Musical Electronics Industry in Tokyo, Japan and The MIDI Manufacturers Association in Los Angeles, California, Nov. 30, 2000, pp. 1–17.

Press Release by Ian Fried of CNET News.com, "Microsoft Releases XP for Slot Machines," file://C:WINDOW . . . \Microsoft releases XP for slot machines—Tech News—CNET.com.htm., Nov. 28, 2001, pp. 1–2.

Press Release, "WMS Gaming's Monopoly Slot Machines Named 1998's Most Innovative Gaming Product At The American Gaming, Lodging and Leisure Summit," published by WMS Gaming Inc. on Jan. 13, 1999.

Screen Shot and Description by IGT of "Free Spins Bonus (Elephant King)" written by IGT, available in Oct., 1999.

Screen Shots of "Race Car Bonus Feature" written by IGT, available in the year 1998 on or before Dec. thereof.

The Java™ Tutorial, "What Can Java Technology Do?" http://java.sun.com/docs/books/tutorial/getStarted/i.../definition.htm, Oct. 16, 2000, pp. 1–2.

The MIDI File Format, http://crystal.capana.org.au/ghansper/midi__introduction/midi__file__format.html, Dec. 28, 2001, pp. 1–10.

Description of Payout Sound Feature in Gaming Machine published by IGT.

Description of Progressive Sound Feature in Pinball and Video Games.

Totem Pole Brochure (and Description of Sound Feature in Totem Pole Gaming Machine) published by IGT.

* cited by examiner

FIG.3

52 54

| TARGETS | NON-TARGETS |
|---|---|
| | 10 |
| | 20 |
| | 30 |
| | 40 56a |
| | 45 56b |
| 50 | |
| | 55 56b |
| | 60 56a |
| | 70 |
| | 80 |
| | 90 |
| | 100 |

FIG.4

58 60

| PITFALLS | NON-PITFALLS |
|---|---|
| | 10 |
| | 20 |
| | 30 |
| | 40 56a |
| | 45 56b |
| 50 | |
| | 55 56b |
| | 60 56a |
| | 70 |
| | 80 |
| | 90 |
| | 100 |

FIG. 5

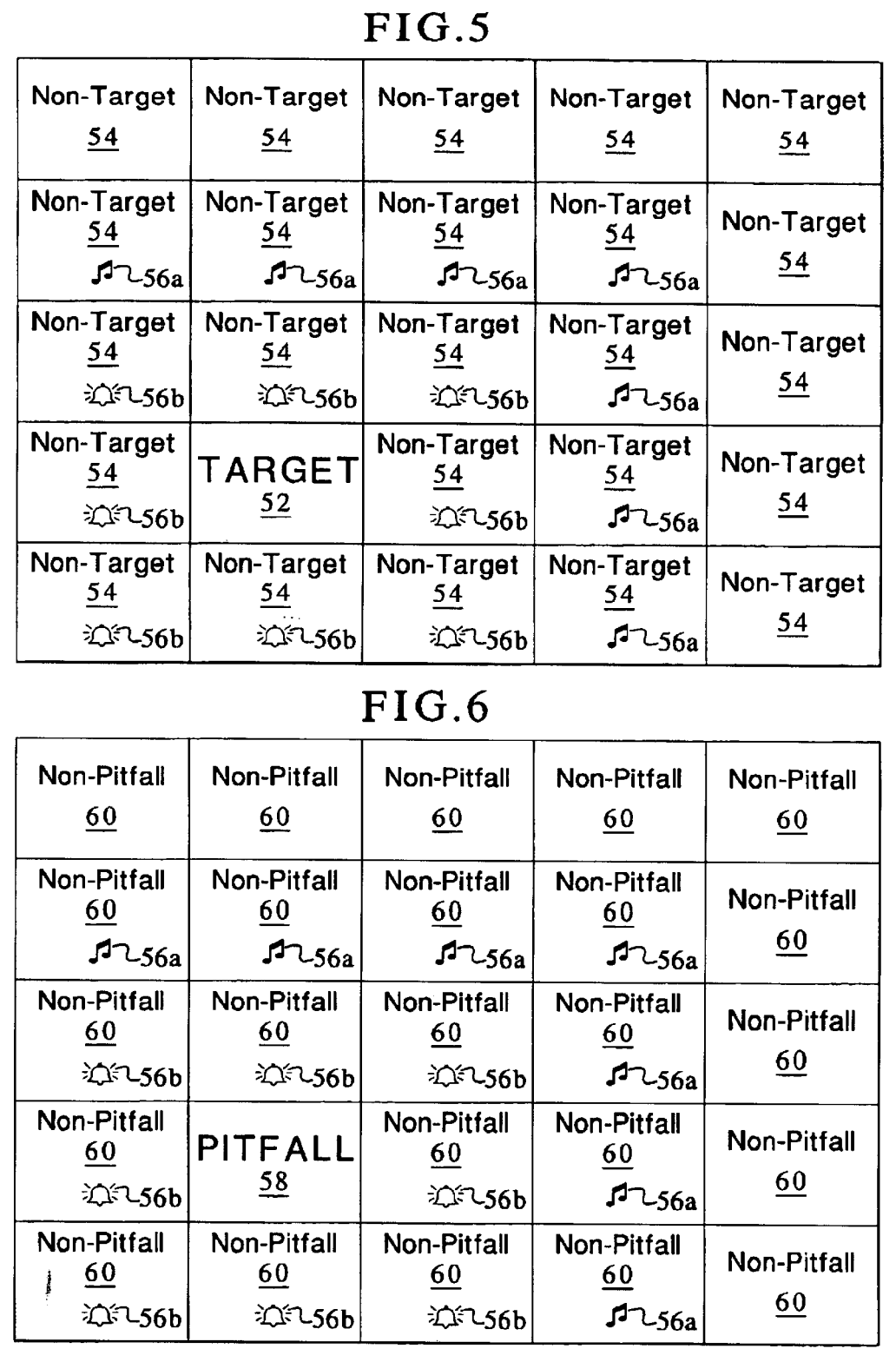

| | | | | |
|---|---|---|---|---|
| Non-Target 54 | Non-Target 54 | Non-Target 54 | Non-Target 54 | Non-Target 54 |
| Non-Target 54 56a | Non-Target 54 56a | Non-Target 54 56a | Non-Target 54 56a | Non-Target 54 |
| Non-Target 54 56b | Non-Target 54 56b | Non-Target 54 56b | Non-Target 54 56a | Non-Target 54 |
| Non-Target 54 56b | TARGET 52 | Non-Target 54 56b | Non-Target 54 56a | Non-Target 54 |
| Non-Target 54 56b | Non-Target 54 56b | Non-Target 54 56b | Non-Target 54 56a | Non-Target 54 |

FIG. 6

| | | | | |
|---|---|---|---|---|
| Non-Pitfall 60 | Non-Pitfall 60 | Non-Pitfall 60 | Non-Pitfall 60 | Non-Pitfall 60 |
| Non-Pitfall 60 56a | Non-Pitfall 60 56a | Non-Pitfall 60 56a | Non-Pitfall 60 56a | Non-Pitfall 60 |
| Non-Pitfall 60 56b | Non-Pitfall 60 56b | Non-Pitfall 60 56b | Non-Pitfall 60 56a | Non-Pitfall 60 |
| Non-Pitfall 60 56b | PITFALL 58 | Non-Pitfall 60 56b | Non-Pitfall 60 56a | Non-Pitfall 60 |
| Non-Pitfall 60 56b | Non-Pitfall 60 56b | Non-Pitfall 60 56b | Non-Pitfall 60 56a | Non-Pitfall 60 |

FIG.10
| NUMBER OF TIMES PLAYER DOES NOT REACH AWARD OR DEDUCTION | SOUND EFFECT |
|---|---|
| 2 | SOUND 2 |
| 3 | SOUND 3 |
| 4 | SOUND 4 |
| 5 | SOUND 5 |
| N | ANY SOUND |
FIG.11
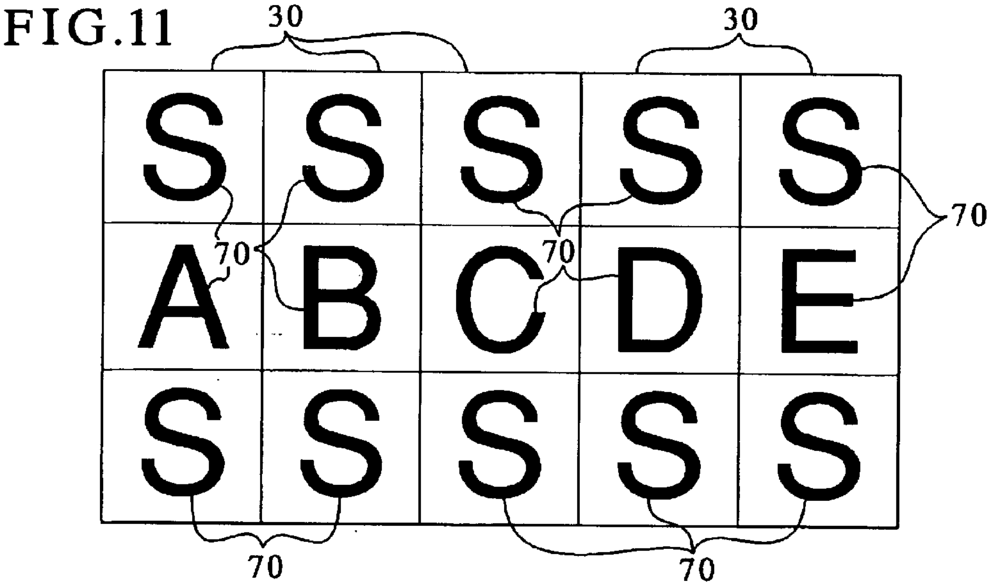
FIG.12
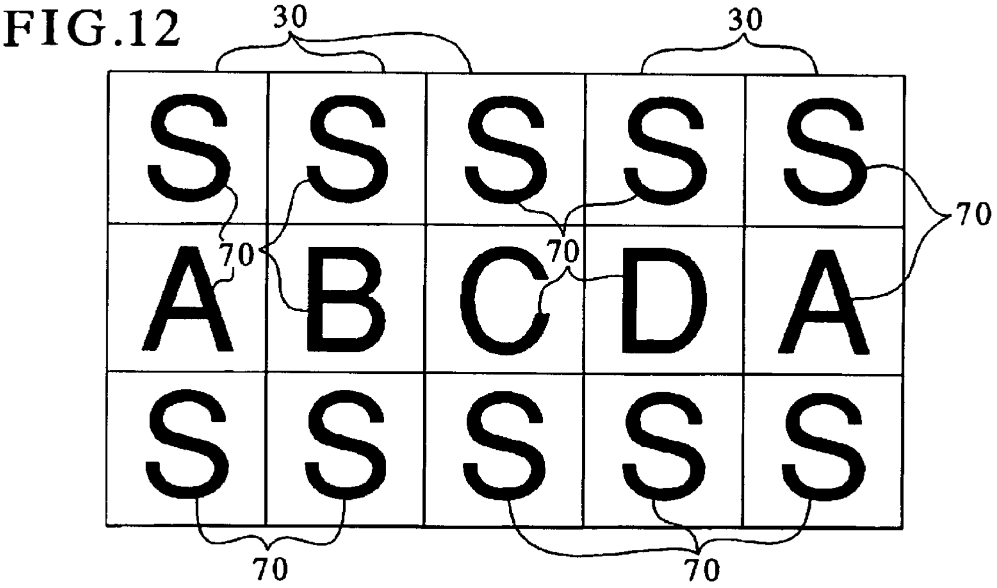

GAMING DEVICE WITH AWARD AND DEDUCTION PROXIMITY-BASED SOUND EFFECT FEATURE

CROSS-REFERENCE TO RELATED APPLICATIONS

This application is related to the following commonly-owned co-pending patent applications: "GAMING DEVICE AND METHOD FOR ENHANCING THE ISSUANCE OR TRANSFER OF AN AWARD," Ser. No. 09/583,482, "GAMING DEVICE PROVIDING AUDIO WAGERING INFORMATION," Ser. No. 09/629,288, "GAMING DEVICE HAVING MULTIPLE AUDIO, VIDEO OR AUDIO-VIDEO EXHIBITIONS ASSOCIATED WITH RELATED SYMBOLS," Ser. No. 09/689,529, and "GAMING DEVICE HAVING CHANGED OR GENERATED PLAYER STIMULI," Ser. No. 09/686,244.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which generates various sound effects based upon a player's proximity to an award or deduction.

BACKGROUND OF THE INVENTION

Existing gaming machines, such as traditional slot machines have certain outcomes in primary games and bonus rounds which result in a player gaining awards or values. Often the outcome is the player reaching a winning value, symbol or combination of symbols out of a relatively large set of non-winning values, symbols or combinations of symbols.

Furthermore, existing gaming devices typically use sound effects to emphasize certain game outcomes. A common sound effect is the sound of a ringing bell when a player wins an award. Various sound effects are used for other events such as the beginning and ending of a primary game and the initiation of a bonus round.

Known gaming devices do not, however, generate sound effects in relation to how close a player comes to reaching a certain outcome or how often a player avoids a certain type of outcome. For example, existing gaming devices do not generate various sound effects when a player comes within a certain proximity to a winning outcome or when a player repeatedly fails to reach certain outcomes for a certain number of times.

To increase player enjoyment and excitement, it is desirable to provide players with new features for gaming devices, where the new features involve sound effects associated with how close a player comes to reaching certain outcomes which do not result in an award or a deduction.

SUMMARY OF THE INVENTION

The present invention overcomes the above shortcomings by providing a gaming device which includes various award and deduction conditions in primary games or bonus rounds and which generates sound effects associated with not reaching certain award and deduction conditions. An award condition, as used herein, includes any game situation or event which results in a player gaining an award. A deduction condition, as used herein, includes any game situation or event which results in a player losing an award. Depending upon the particular design of the gaming device, these conditions can occur in a variety of scenarios.

A preferable award condition is a player reaching targets. The targets are certain values, symbols or combinations of symbols. The targets are preferably included within a set of non-targets. Non-targets are also certain values, symbols or combinations of symbols, but they are numerically different from and/or spatially separated from the targets. If the player reaches a target, the gaming device provides the player with an award.

If the player does not reach the target, the gaming device does not provide an award. However, if the non-target which the player reached is numerically and/or spatially within a predetermined proximity to a target, the gaming device generates a sound effect. For example, an award condition may be a player reaching the value ten, which is the target. When a player reaches eight, nine, eleven or twelve, the gaming device may generate a sound effect, but if a player reaches any other number (other than ten), the gaming device might not generate a sound effect. Furthermore, the gaming device can generate different sound effects in relation to how far away (numerically and/or spatially) a non-target is from a target. In the current example with the target value ten, the sound effects which the game generates for reaching the values nine and eleven may be different than the sound effects generated for reaching the values eight and twelve.

A preferable deduction condition is the player reaching pitfalls. Piffalls are predetermined values, symbols or combinations of symbols. The pitfalls are preferably included within a set of non-piffalls which are also predetermined values, symbols or combinations of symbols. However, the non-piffalls are numerically different from and/or spatially separated from the pitfalls. If the player reaches a pitfall, the gaming device deducts an award or portion of an award from the player. If the player avoids a pitfall the gaming device may generate a sound effect if the non-pitfall which the player reached is numerically and/or spatially within a predetermined proximity to a pitfall.

For example, a deduction condition can be a player reaching the value twenty, which is the pitfall. When a player reaches eighteen, nineteen, twenty-one or twenty-two, the gaming device generates a sound effect, but if a player reaches any other number (other than twenty), the gaming device will not generate a sound effect. Furthermore, the gaming device can generate different sound effects in relation to how far away (numerically and/or spatially) a non-pitfall is from a pitfall. In the above example where the pitfall value is twenty, the sound effects which the game generates for reaching the values nineteen and twenty-one may be different than the sound effects generated for reaching the values eighteen and twenty-two.

Furthermore, when a player does not reach an award condition or deduction condition repeatedly for a predetermined number of times, the gaming device preferably generates a sound effect. For example, if a player misses a target five times, the gaming device generates a certain sound effect.

In one preferred embodiment, a bonus round includes two characters on a path and a plurality of award conditions. As described above, the award conditions involve target values and non-target values. The game scenario involves a character chasing another character along the path. The player uses a play button or activator to generate values which determine how many steps each character will move and ultimately determine where the characters will be located with respect to one another. Here, the target value is the number of steps to be taken by the chasing character such that the fleeing character would be caught. The non-target value is the number of steps to be taken by the fleeing character such that the chasing character would not catch the fleeing character.

If the player reaches certain predetermined non-target values, the gaming device generates a sound effect. These non-target values are within a predetermined proximity with respect to the target value. For example, if the chasing character must make five steps to catch the fleeing character, the gaming device may generate a sound effect if the chasing character makes four steps. In the same example, if the chasing character makes one, two or three steps, the gaming device may not generate a sound effect. In addition, the sound effects can vary depending upon how far away the chasing character is from the fleeing character. For instance if the chasing character lands one step behind the fleeing character, the gaming device may generate one type of sound effect, and if the chasing character lands two steps behind the fleeing character, the gaming device may generate another type of sound effect.

In another embodiment of the present invention in a primary game or bonus round, the gaming device includes a plurality of award conditions and a plurality of targets. The targets are hearts, and the gaming device enables the player to shoot an arrow directed towards the hearts. If the player does not hit a heart within a certain number of attempts, the gaming device generates a sound effect.

In yet another embodiment in a primary game or bonus round, the targets are predetermined combinations of symbols appearing on a plurality of reels. If the player reaches such a target, the gaming device generates a sound effect. If the player does not reach such a target but comes within a certain proximity to the target, the gaming device generates a sound effect.

The present invention provides gaming devices with informative and entertaining sound effects. The sound effects are generated when a player comes within a certain proximity of receiving an award or deduction. Also, sound effects are generated when a player does not reach an award after having made a certain number of attempts.

It is therefore an object of the present invention to provide a gaming device with sound effects based upon a player's proximity to an award or deduction.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 3 is a table of target values and non-target values in one embodiment of the present invention;

FIG. 4 is a table of pitfall values and non-pitfall values in one embodiment of the present invention;

FIG. 5 is a top plan view of non-target symbols and a target symbol in one embodiment of the present invention; and FIG. 6 is a top plan view of non-pitfall symbols and a pitfall symbol in one embodiment of the present invention.

FIG. 10 is a table of the number of times a player does not reach an award or deduction in relation to sound effect type in one embodiment of the present invention;

FIG. 11 is a top plan view of the reels and an illustrative winning combination in one embodiment of the present invention; and FIG. 12 is a top plan view of the reels and an illustrative sound effect-causing combination in one embodiment of the present invention.

DETAILED DESCRIPTION OF THE INVENTION

Gaming Device and Electronics

Figure 1:
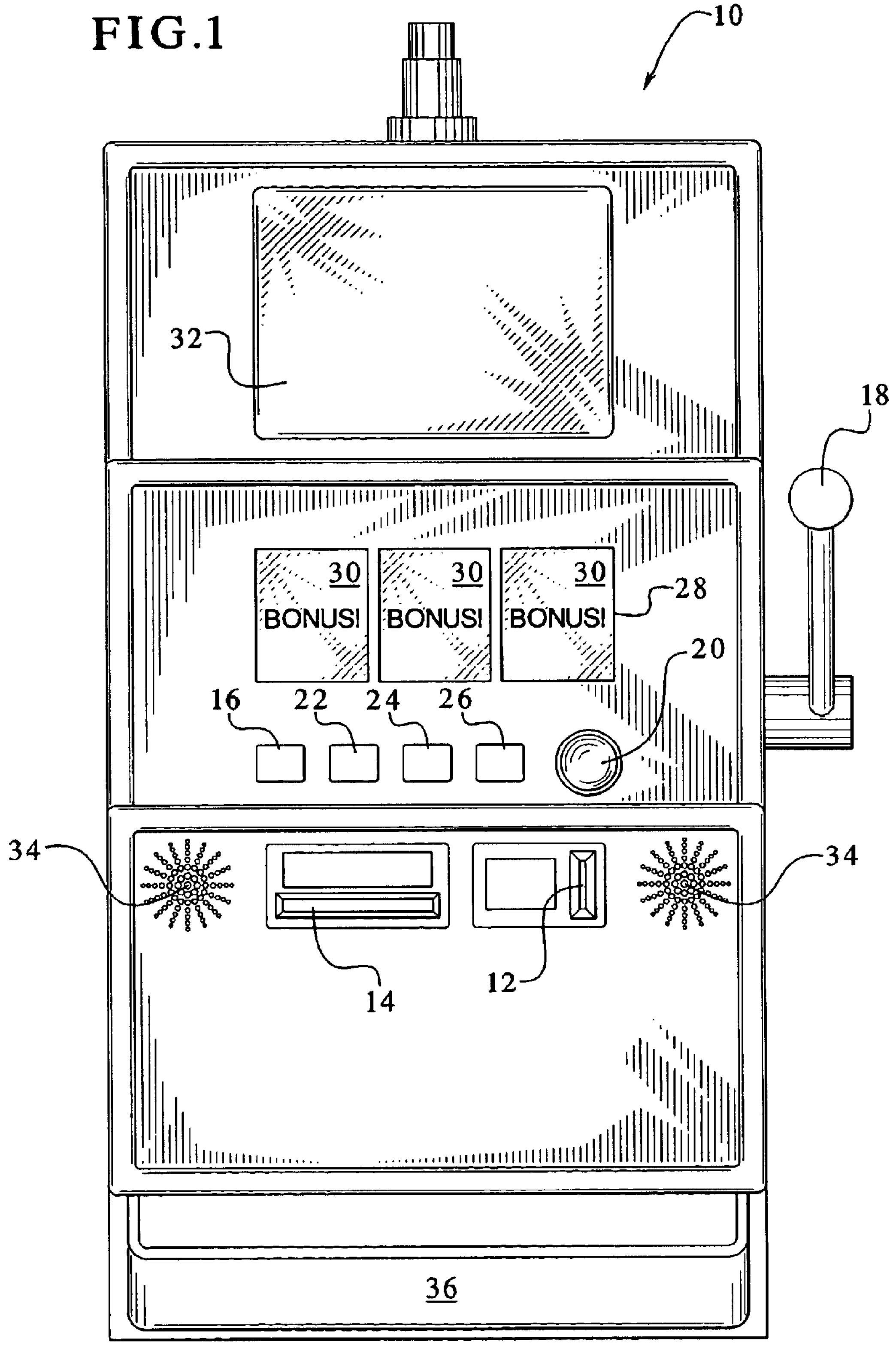
FIG. 1 is a front elevational view of one embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) which a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno in addition to any of their bonus triggering events which trigger the bonus scheme of the present invention. The symbols and indicia used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device 10.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a display window 28 which contains a plurality of reels 30, preferably three to five reels in mechanical or video form. Each reel 30 displays a plurality of indicia such as bells, hearts, fruits, numbers, letters, bars or other images which preferably correspond to a theme associated with the gaming device 10. If the reels 30 are in video form, the gaming device 10 preferably displays the video reels 30 at a display device such as a video monitor 32 instead of at display window 28. Furthermore, gaming device 10 preferably includes speakers 34 for making sounds or playing music.

At any time during the game, a player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards which keep track of the player's credits.

Figure 2:
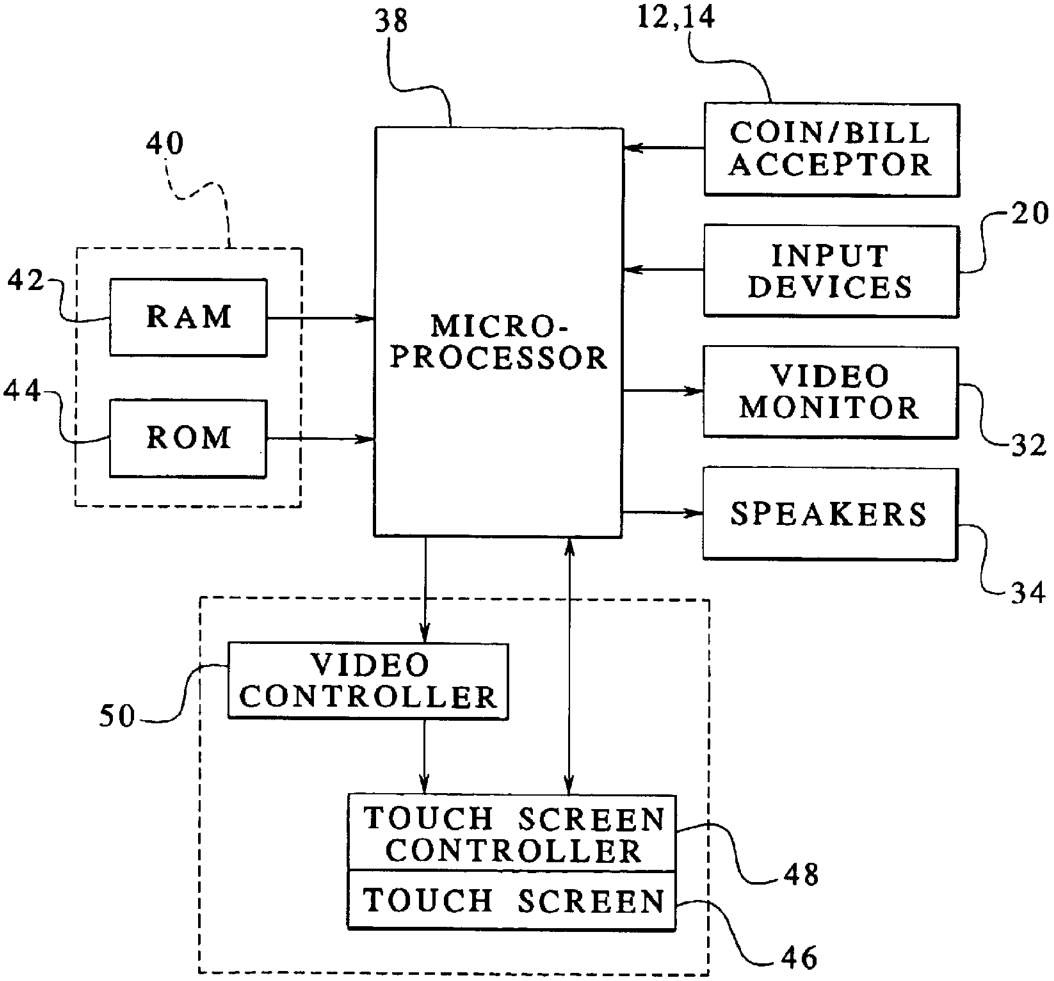
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 38, a memory device 40 for storing program code or other data, a video monitor 32 and at least one input device such as play buttons 20. The processor 38 is preferably a microprocessor or microcontroller-based platform which is capable of displaying images, symbols and other indicia such as images of people, characters, places, things and faces of cards. Video monitor 32 is a surface on which images are displayed including any video display device or other display device (i.e., a liquid crystal display). The memory device 40 can include random access memory (RAM) 42 for storing event data or other data generated or used during a particular game. The memory device 40 can also include read only memory (ROM) 44 for storing program code which controls the gaming device 10 so that it plays a particular game in accordance with applicable game rules and pay tables.

As illustrated in FIG. 2, the player preferably uses play buttons 20 to input signals into gaming device 10. Furthermore, it is preferable that touch screen 46 and an associated touch screen controller 48 are used instead of a conventional monitor 32. Touch screen 46 and touch screen controller 48 are connected to a video controller 50 and processor 38. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer."

With reference to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, preferably gaming device 10 also gives players the opportunity to win credits in a bonus round. This type of gaming device 10 will include a program which will automatically begin a bonus round preferably when a predetermined combination of indicia appears on a plurality of reels 30. As illustrated in the three reel slot game shown in FIG. 1, the predetermined combination of indicia could be the text "BONUS!" appearing in the same location on three adjacent reels.

Sound Effect Function

The sound effect function of the present invention can be included in a primary game and/or bonus scheme of a gaming device. A gaming device, which includes the sound effect function of the present invention, includes one or more award conditions and/or deduction conditions. These conditions are programmed into the computer of the gaming device and are preferably predetermined. However, these conditions can be randomly generated during the operation of a primary game or bonus round. Furthermore, the award conditions or deduction conditions can occur once a player pushes a play button 20 or other activator device, or the computer may automatically cause these conditions to occur.

When an award condition occurs, the gaming device provides the player with an award, and when a deduction condition occurs, the gaming device deducts value from the player. Preferably, the award condition is satisfied when the player reaches a particular target when faced with the possibility of reaching a plurality of non-targets. Likewise, it is preferable that the deduction condition is satisfied when the player reaches a particular pitfall when faced with the possibility of reaching a plurality of non-pitfalls.

Some and preferably all of the targets and non-targets have a numeric and/or spatial relationship with each other. For example, on one occasion, if the targets and non-targets are separated by numeric values, the player can reach a non-target which is within a certain numeric proximity to the target. On another occasion, the player can reach a different non-target which is within a different numeric proximity to the target.

This same concept applies to targets and non-targets which are spatially related to one another. For instance, monitor 32 can display a plurality of non-targets and one or more targets. On various occasions, the player can select various non-targets, some of which are closer to and some of which are further from the targets. The foregoing description about targets and non-targets also applies to pitfalls and non-pitfalls. The only difference is that instead of the player aiming to reach targets, the player aims to avoid pitfalls.

The gaming device with the sound effect function of the present invention generates various sound effects depending upon the proximity of the non-target which the player reaches to the target. As illustrated in FIG. 3, the targets 52 and non-targets 54 are numeric values. The target 52 is the value fifty, and the non-targets 54 include a plurality of values ranging from ten to one hundred. In the example illustrated in FIG. 3, if a player reaches a non-target value of forty, forty-five, fifty-five or sixty, the gaming device generates a sound effect 56. The sound effects 56 are indicated in FIG. 3 as key notes and bells. Preferably, as illustrated in FIG. 3, the type of sound effect 56 varies depending upon the proximity of the non-target value to the target value. In the example illustrated in FIG. 3, the gaming device generates one type of sound effect 56*b* for reaching a non-target value of forty-five or fifty-five, and the gaming device generates a different type of sound effect 56*a* for reaching a non-target value of forty or sixty.

The gaming device also generates sound effects 56 in this manner for the player avoiding deduction conditions. As illustrated in FIG. 4, the gaming device can include one pitfall 58 which the player seeks to avoid and a plurality of non-pitfalls 60 which the player seeks to reach. Furthermore, the gaming device can generate various sound effects 56, as illustrated in FIG. 4, which are associated with the non-pitfall values. In this illustration, the pitfall value is fifty, and the non-pitfall values range from ten to one hundred. If the player reaches a non-pitfall value of forty, forty-five, fifty-five or sixty, the gaming device generates a sound effect 56*a* or 56*b*. As illustrated in FIG. 4, the sound effects 56 preferably vary depending upon their proximity to the pitfall value.

Furthermore, as shown in FIG. 5, targets 52 and non-targets 54 can be symbols displayed on monitor 32 instead of values. In this type of scheme, the player aims to select a target 52, however, when the player makes a selection, the player does not know whether the selection will be a target 52 or a non-target 54. As shown in FIG. 5, one or more targets 52 is included within a plurality of non-targets 54. In this illustration, the target 52 is located in the fourth row from the top and the second column from the left hand side of the grid shown in FIG. 5. All other selections are non-targets 54. The gaming device will generate a sound effect 56*a* or 56*b* if the player selects any non-target 54 in the first or second layer of non-targets 54 surrounding the target 52. Preferably, as indicated by the different sound effect symbols 56*a* or 56*b* in FIG. 5, the sound effects vary depending upon how close the player comes to selecting the target 52.

As shown in FIG. 6, the same concept applies for pitfalls 58 and non-pitfalls 60 except here, the player's goal is to avoid the pitfall 58 and reach non-pitfalls 60. Preferably, in the target and non-target context, the sound effects 56 encourage the player or otherwise inform the player that the player is close to reaching a target 52. In the non-pitfall and pitfall context, preferably the sound effects 56 warn the player or otherwise inform the player that the player is approaching a pitfall 58. It should be appreciated that the target 52, non-targets 54, pitfall 58 and non-piffalls 60 are shown as squares in FIGS. 5 and 6 merely for illustrative purposes. They, instead, can be displayed or exhibited in any audio, visual or audio-visual form.

Figure 7:
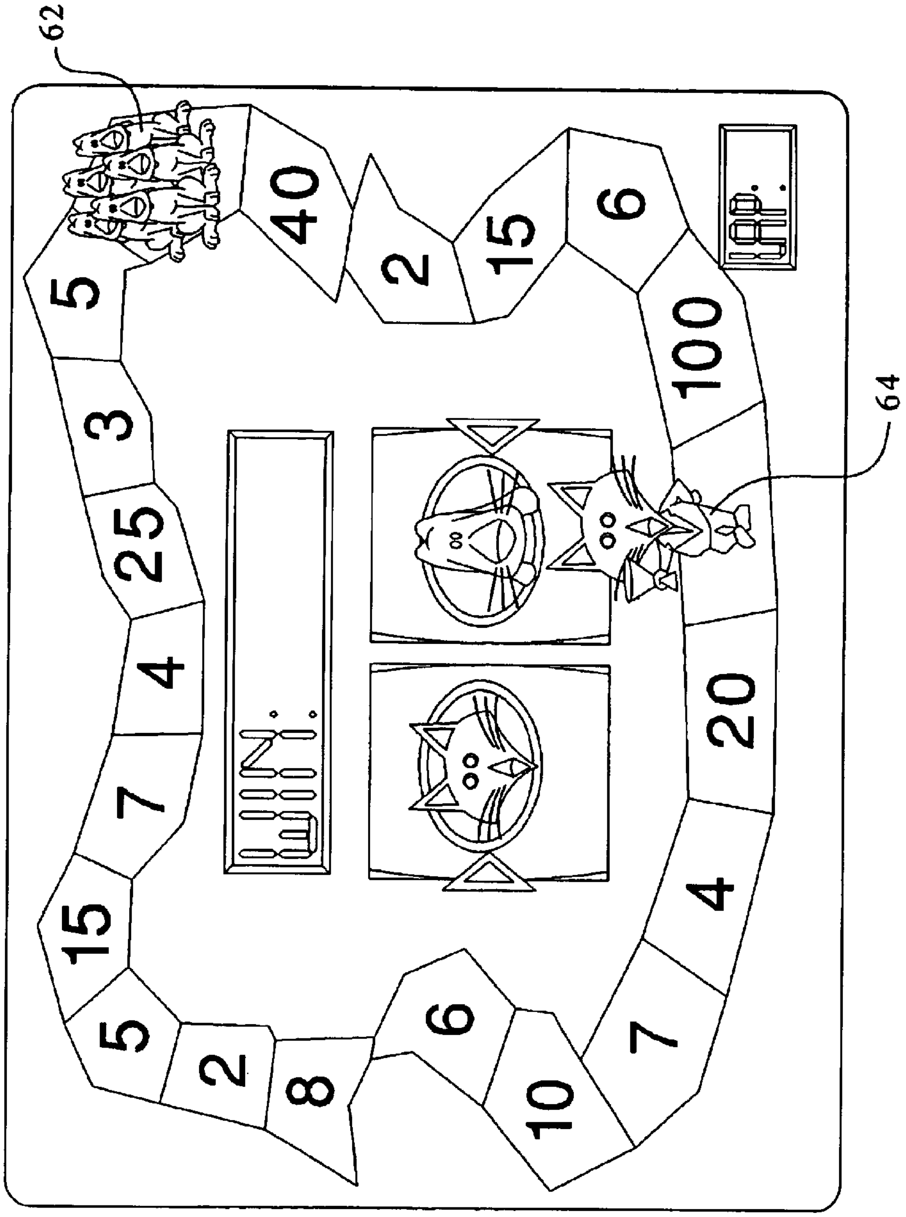
FIG. 7 is a top plan view of the chasing character and fleeing character scheme in one embodiment of the present invention.
Figure 8:
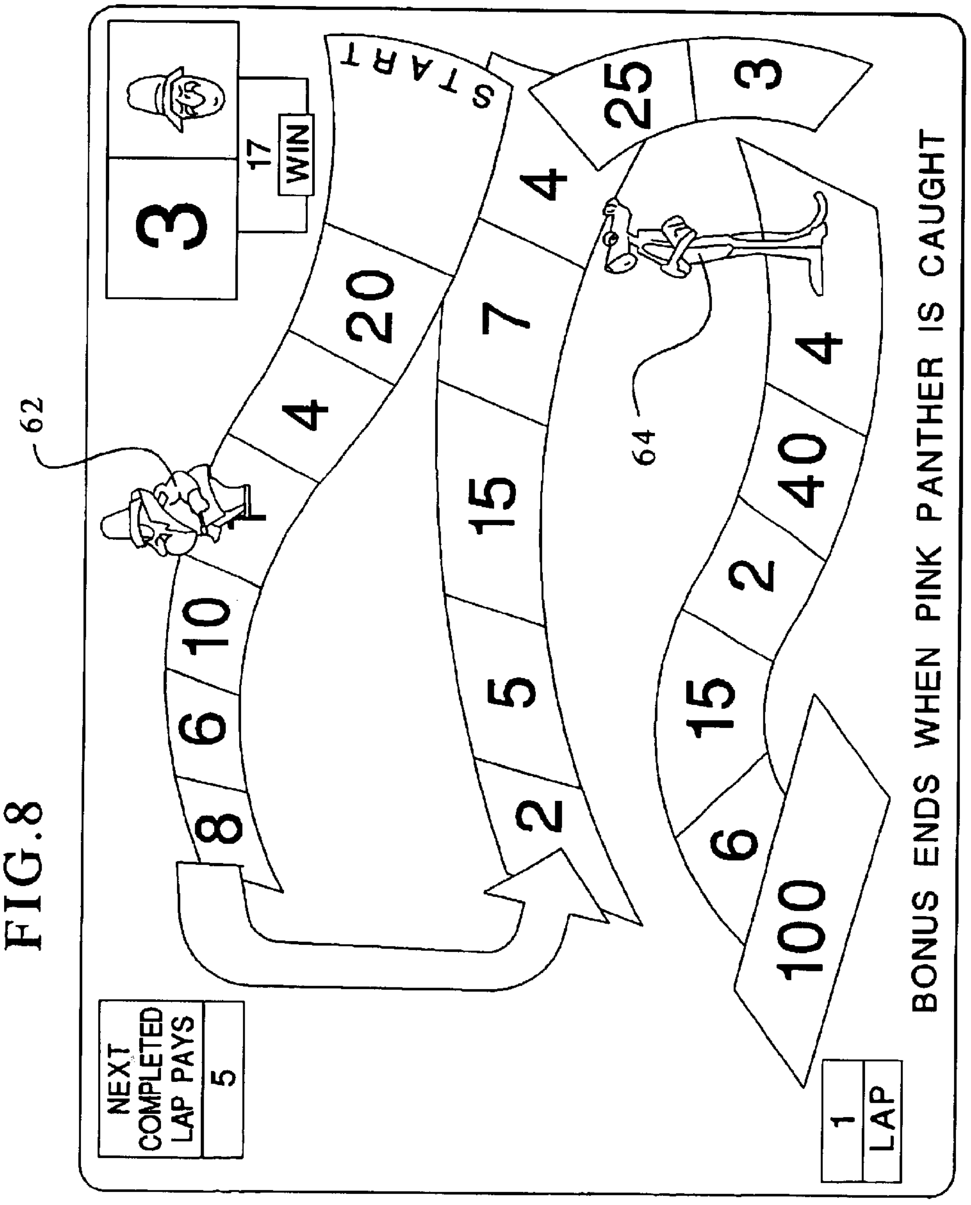
FIG. 8 is a top plan view of the chasing character and fleeing character scheme in another embodiment of the present invention.

In two preferred embodiments show in FIGS. 7 and 8, the scheme in the primary game or bonus round involves one character chasing another character along a path. The term character, as used herein, means a single character or a group of characters which move together as one group. When the chasing character 62 catches the fleeing character 64, the player receives value. The player causes the characters to move by pushing a play button 20. After pushing this button 20, each player moves a certain number of steps forward along the path. Depending upon how many steps each character moves with respect to one another, the chasing character 62 may or may not catch the fleeing character 64. In these preferred embodiments, the target 52 is the number of steps that the chasing character 62 must take in order to catch the fleeing character 64. As the player pushes the play button 20 on different occasions, the gaming device will generate a target value which will vary. Accordingly, the proximity of the chasing character 62 to the fleeing character 64 will vary. When the player reaches certain target values (or when the chasing character 62 comes within a certain number of steps away from the fleeing character 64), the gaming device will generate a sound effect. This sound effect may vary depending upon the target value.

For example, on one occasion, the player may push the play button 20 causing the chasing character 62 to come within four steps away from the fleeing character 64, and the gaming device may not generate a sound effect. On another occasion, the player may push the play button 20 causing the chasing character 62 to come within two steps away from the fleeing character 64, and the gaming device may generate a sound effect. In addition, the gaming device may generate different sound effects depending upon how close the chasing character 62 comes to the fleeing character 64. For example, the gaming device may generate one type of sound effect if the chasing character 62 comes within two steps from the fleeing character 64, and the gaming device may generate another type of sound effect if the chasing character 62 comes within one step from the fleeing character 64.

Figure 9:
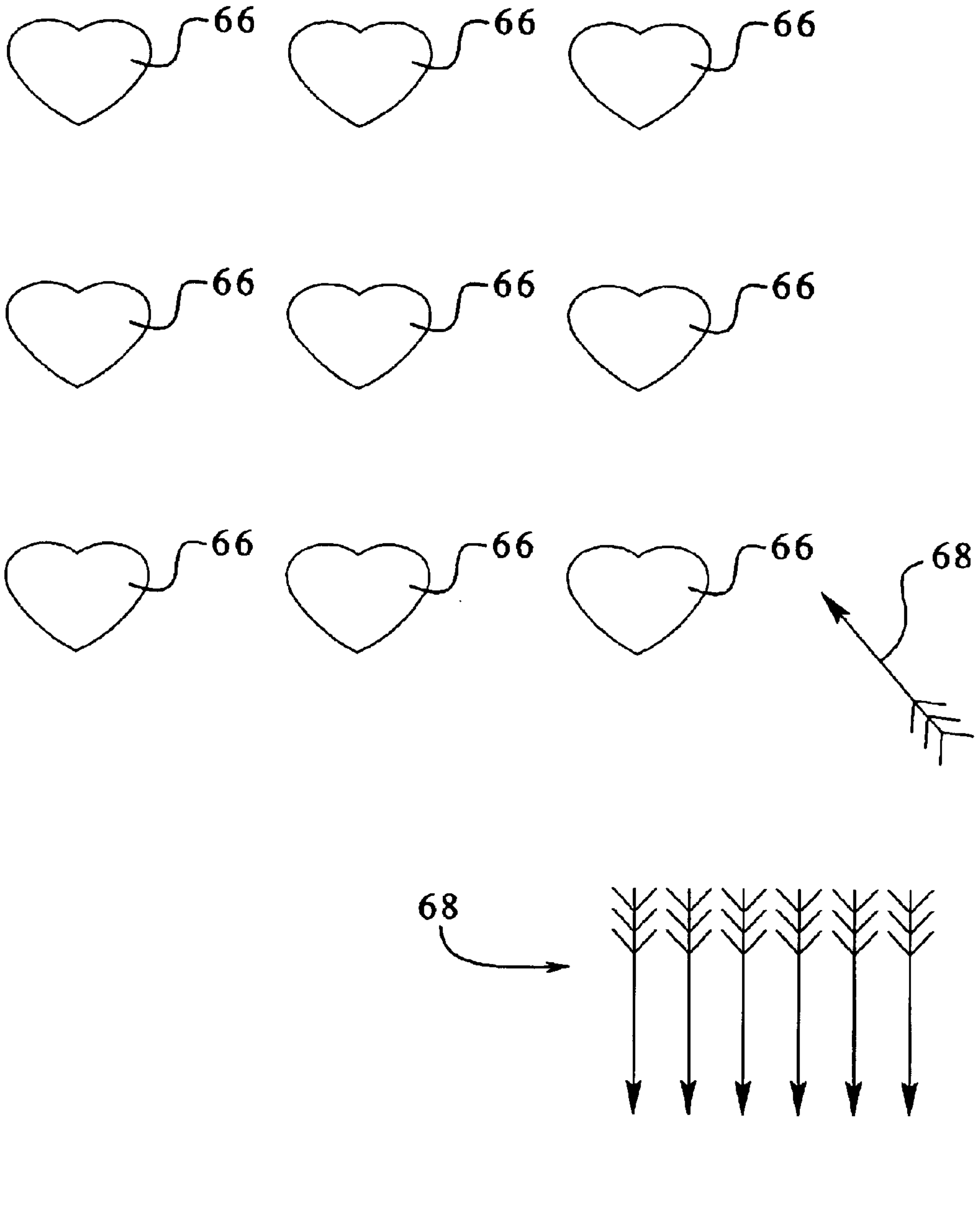
FIG. 9 is a top plan view of the heart and arrow scheme in one embodiment of the present invention.

In another embodiment illustrated in FIG. 9, the targets are a plurality of hearts 66. The gaming device provides the player with a definite number of arrows 68. When the player pushes the play button 20 or other activator, the gaming device shoots an arrow 68 directed towards the plurality of hearts 66. If the arrow 68 strikes a heart 66, the player gains value. If the player misses a heart 66, the player gains no value. If the player fails to strike a heart 66 after a certain number of attempts, the gaming device will generate a predetermined or randomly generated sound effect. Preferably, the sound effect expresses disappointment, such as the sound of a voice stating, "Oh, No!" An illustrative table for this embodiment is shown in FIG. 10. If a player fails to reach an award condition after a certain number of attempts, the gaming device can generate a sound effect associated with that number of attempts. Furthermore, if a player successfully avoids a deduction condition a certain number of times, the gaming device can generate a sound effect associated with those number of times.

In an alternative embodiment of the present invention shown in FIGS. 11 and 12, the targets are predetermined combinations of symbols 70 appearing on reels 30. In FIG. 11, the winning combination is illustrated as the combination of the following letters in the following order: A, B, C, D and E. If the player reaches this combination, the gaming device awards the player with value. If the player does not reach this combination but reaches a certain proximity to this combination, the gaming device generates a sound effect. In the example shown in FIG. 12, if a player comes within a proximity of one letter away from a target combination, the gaming device generates a sound effect. Here, the player reached the combination of A, B, C, D and A. As such, the player did not reach the target and will not receive value. However, since the player came within one letter from the predetermined target combination, the gaming device generates a sound effect.

The sound effect function of the present invention enables gaming devices to generate sound effects when a player does not reach an award or penalty (i.e., value deduction). Instead, the sound effects relate to a player's proximity to an award or penalty. If a player comes close enough to an award or penalty, the gaming device generates a sound effect. The gaming device also generates a sound effect if a player fails to reach an award for a certain number of times. This type of sound effect feature provides gaming device players with information and entertainment. While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

What is claimed is:

1. A gaming device comprising:

a target;

a plurality of non-targets having a plurality of different proximities to the target;

a display device adapted to display said target and non-targets;

at least one speaker;

a plurality of different sound effects associated with the different proximities of the non-targets to the target;

a predetermined number of times associated with the non-targets; and a processor operable to control a game upon a wager by a player, for causing selection of said target or one of the non-targets, counting the number of times one of the non-targets is selected, and upon reaching said predetermined number, causing the speaker to generate:

(a) one of said sound effects when one of the non-targets is selected, said non-target having one of the proximities to the target; and (b) another one of the sound effects when another one of the non-targets is selected, said other non-target having a different one of the proximities to the target.

2. The gaming device of claim 1, wherein the target or one of the non-targets is processor selected.

3. The gaming device of claim 1, wherein the target or one of the non-targets is player selected.

4. A gaming device comprising:

a target;

a plurality of non-targets including at least two non-targets which have a plurality of different proximities from said target;

a display device adapted to display said target and non-targets;

at least one speaker;

a plurality of different sound effects associated with said different proximities;

a predetermined number of times associated with each of said proximities; and a processor operable to control a game upon a wager by a player, for causing selection of said target or one of the non-targets, counting the number of times one of the non-targets within said predetermined proximity from said target is selected, and upon reaching said predetermined number, causing the speaker to generate:

(a) one of said sound effects when said processor selects one of the non-targets within one of said proximities from said target; and (b) a different one of the sound effects when said processor selects a different one of the non-targets within a different one of the proximities from said target.

5. The gaming device of claim 4, wherein the target or one of the non-targets is processor selected.

6. The gaming device of claim 4, wherein the target or one of the non-targets is player selected.

7. A gaming device comprising:

a target;

a plurality of non-targets including at least two non-targets which have a plurality of different proximities from said target;

a display device adapted to display said target and non-targets;

at least one speaker;

a first sound effect associated with one of said proximities;

a second sound effect, which is different from the first sound effect, associated with another one of the proximities;

a predetermined number of times associated with each of said proximities; and a processor operable to control a game upon a wager by a player, for causing selection of said target or one of the non-targets, counting the number of times one of the non-targets within one of the proximities from said target is selected, causing the speaker to generate said first sound effect when one of the non-targets within one of the proximities from said target is selected, and upon reaching said predetermined number, causing the speaker to generate said second different sound effect when a different one of the non-targets within a different one of the proximities from said target is selected.

8. The gaming device of claim 7, wherein the target or one of the non-targets is processor selected.

9. The gaming device of claim 7, wherein the target or one of the non-targets is player selected.

10. A gaming device comprising:

a pitfall;

a plurality of non-pitfalls having a plurality of different proximities to the pitfall;

a display device adapted to display said pitfall and non-pitfalls;

at least one speaker;

a plurality of different sound effects associated with the different proximities of the non-pitfalls to the pitfall;

a predetermined number of times associated with each of the non-pitfalls; and a processor operable to control a game upon a wager by a player, for causing selection of said pitfall or one of the non-pitfalls, counting the number of times one of the non-pitfalls is selected, and upon reaching said predetermined number, causing the speaker to generate:

(a) one of the sound effects associated with one of the proximities when one of the non-pitfalls is selected; and (b) a different one of the sound effects associated with a different one of the proximities when a different one of the non-pitfalls is selected.

11. The gaming device of claim 10, wherein the pitfall or one of the non-piffalls is processor selected.

12. The gaming device of claim 10, wherein the pitfall or one of the non-pitfalls is player selected.

13. A gaming device comprising:

a pitfall;

a plurality of non-piffalls including at least two non-pitfalls which have a plurality of different proximities from said pitfall;

a display device adapted to display said pitfall and non-piffalls;

at least one speaker;

a plurality of different sound effects associated with said different proximities;

a predetermined number of times associated with each of the different proximities; and a processor operable to control a game upon a wager by a player, for causing selection of said pitfall or one of the non-piffalls, counting the number of times one of the non-piffalls within one of the proximities from said pitfall is selected, and upon reaching said predetermined number, causing the speaker to generate:

(a) one of said sound effects when said processor selects one of the non-pitfalls within one of the proximities from said pitfall; and (b) another one of the sound effects when said processor selects another one of the non-piffalls within another one of the proximities from said pitfall.

14. The gaming device of claim 13, wherein the pitfall or one of the non-piffalls is processor selected.

15. The gaming device of claim 13, wherein the pitfall or one of the non-piffalls is player selected.

16. A gaming device comprising:

a pitfall;

a plurality of non-pitfalls including at least two non-pitfalls which have a plurality of different proximities from said pitfall;

a display device adapted to display said pitfall and non-piffalls;

at least one speaker;

a first sound effect associated with one of the different proximities;

a second sound effect, which is different from the first sound effect, associated with another one of the different proximities;

a predetermined number of times associated with each of the different proximities from said pitfall; and a processor operable to control a game upon a wager by a player, for causing selection of said pitfall or one of the non-piffalls, counting the number of times one of the non-piffalls within one of the proximities from said pitfall is selected, causing the speaker to generate said first sound effect when one of the non-pitfalls within one of the proximities from said pitfall is selected, and upon reaching said predetermined number, causing the speaker to generate said second different sound effect when another one of the non-piffalls within another one of the proximities from said pitfall is selected.

17. The gaming device of claim 16, wherein the pitfall or one of the non-pitfalls is processor selected.

18. The gaming device of claim 16, wherein the pitfall or one of the non-piffalls is player selected.

19. A method of operating a gaming device comprising the steps of:

operating a game upon a wager by a player;

displaying a target;

displaying a plurality of non-targets including at least two non-targets which have a plurality of different proximities from said target;

selecting either said target or one of the non-targets a plurality of times;

for each of the non-targets, counting the number of times said non-target is selected from within one of said proximities from said target;

for each of the non-targets, reaching a predetermined number of times said non-target is selected from within one of said proximities from said target;

generating a sound effect when one of the non-targets is selected from within one of said proximities from said target after one of the predetermined number of times is reached; and generating a different sound effect when a different one of the non-targets is selected from within a different one of said proximities from said target after another one of the predetermined number of times is reached.

20. A method of operating a gaming device comprising the steps of:

operating a game upon a wager by a player;

displaying a target;

displaying a plurality of non-targets including at least two non-targets which are a plurality of different proximities from said target;

selecting either said target or one of the non-targets a plurality of times;

generating a first sound effect when one of the non-targets is selected from within one of said proximities;

counting the number of times said non-target is selected from within said proximity from said target;

reaching a predetermined number of times said non-target is selected from within said proximity from said target;

generating a second different sound effect when said non-target is selected from within said proximity from said target after the predetermined number of times is reached; and generating a third different sound effect when a different one of the non-targets is selected from within another one of the proximities.

21. A method of operating a gaming device comprising the steps of:

operating a game upon a wager by a player;

displaying a pitfall;

displaying a plurality of non-piffalls including at least two non-pitfalls which have a plurality of different proximities from said pitfall;

selecting either said pitfall or one of the non-pitfalls a plurality of times;

counting the number of times a plurality of the non-pitfalls are selected from within the proximities from said pitfall;

reaching a predetermined number of times the non-piffalls are selected from within the proximities from said pitfall;

generating a sound effect when one of the non-pitfalls is selected from within one of the proximities from said pitfall after the predetermined number of times is reached; and generating a different sound effect when a different one of the non-pitfalls is selected from within another one of the proximities from said pitfall after the predetermined number of times is reached.

22. A method of operating a gaming device comprising the steps of:

operating a game upon a wager by a player;

displaying a pitfall;

displaying a plurality of non-pitfalls including at least two non-pitfalls which have a plurality of different proximities from said pitfall;

selecting either said pitfall or one of the non-piffalls a plurality of times;

generating a first sound effect when one of the non-pitfalls is selected from within one of the proximities;

generating a second sound effect, different from the first sound effect, when a different one of the non-pitfalls is selected from within another one of the proximities;

counting the number of times one of the non-piffalls is selected from within one of the proximities from said pitfall;

reaching a predetermined number of times one of the non-piffalls is selected from within one of the proximities from said pitfall; and generating a third different sound effect when one of the non-pitfalls is selected from within one of the proximities from said pitfall after the predetermined number of times is reached.

* * * * *